United States Patent Office 2,947,760
Patented Aug. 2, 1960

2,947,760
CHROMAN DERIVATIVES

Pieter Bruin and Arie Klootwijk, Amsterdam, Netherlands, assignors to Shell Oil Company, a corporation of Delaware No Drawing. Filed May 16, 1957, Ser. No. 659,462

Claims priority, application Netherlands May 17, 1956

4 Claims. (Cl. 260—345.2)

This invention concerns a new class of phenylchroman derivatives, a method for their preparation and their use as pesticides. More specifically the present invention is concerned with new polyalkyl-hydroxy-phenylchroman derivatives which are suitable as starting materials and curing agents for macromolecular compounds and which possess pesticidal properties. The use of these derivatives as curing agents for epoxy resins is described in detail in copending application, Serial Number 658,487, filed May 13, 1957, and their utilization in the preparation of cross-linked insoluble polymers is described in copending application Serial Number 658,518, filed May 13, 1957.

Polymethylhydroxy - phenylchromans are already known. Their preparation from phenols and ketones by condensation in an acid medium, e.g. in the presence of concentrated hydrochloric acid is described, for example, in U.S. Patents Numbers 2,418,458 and 2,418,459. According to these patents only chroman derivatives having not more than one hydroxy group per molecule were prepared.

As a result of the presence of only one hydroxyl group these compounds are unsuitable as starting materials for the preparation of macromolecular compounds of the ethoxyline type for which at least two hydroxyl groups are required, and still less suitable as curing agents in which there is great interest at the moment, and in which three or more hydroxyl groups should preferably be present.

It is consequently the principal object of the present invention to provide polyalkylhydroxy-phenylchromans containing at least two hydroxyl groups.

Another object of the present invention is to provide a method for the preparation of polyalkylhydroxy-phenylchromans containing at least two hydroxyl groups in the crystalline state.

Other objects, features, and advantages of the present invention will be apparent from the following description read in conjunction with the appended claims.

The chroman derivatives of the present invention are polyalkylhydroxy-phenylchroman derivatives containing at least two phenolic hydroxyl groups per molecule. Preferred compounds of the group have the formula:

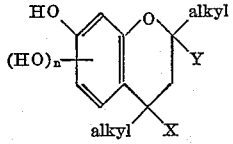

in which X and Y are dissimilar and either an alkyl group which may contain 1–5 carbon atoms or a

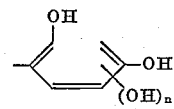

group, and in which n is 1 or 0. The alkyl groups are preferably methyl groups. Examples of the compounds include, among others, 2,4,5-trimethyl-7,2-,4'-trihydroxyflavan, 2,4,4-trimethyl-5,7,2',4',6'-pentahydroxyflavan, 2,4-diethyl-4-methyl-7,2',4'-trihydroxyflavan and 2,4,4-trimethyl-6,7,2',4',5'-pentahydroxyflavan.

The preparation may be carried out by any method which is suitable for compounds of this type, e.g. similar to that described in the above-mentioned U.S. patent specification, viz. starting from a phenol and a ketone. In the method described in these patent specifications, polymethylhydroxy-phenylchroman was invariably obtained in an amorphous, resinous state. It is, however, of great importance for many of the objects described above that the said compounds should be obtained in a good crystallized state.

It has now been found that in the preparation of the new compounds, starting from polyhydric phenols and acetone, at least 50 parts by weight of water must be present per 100 parts by weight of polyhydric phenol, if it is desired to obtain the compound in good yield and in good crystalline form. In excess of 100 parts by weight of water per 100 parts by weight polyhydric phenol have resulted in good yield. A quantity of 80–120 parts by weight of water is preferably used. Moreover, it has been found that in this condensation reaction the reaction temperature can only be increased to a maximum of 70° C., while at the same time a strong inorganic acid must be present as catalyst in an amount not exceeding 20% by weight, calculated on the quantity of polyhydric phenol.

The acid used is, for example, HCl, $H_2SO_4$ or $H_3PO_4$, preferably 2–15% by weight calculated on the amount of polyhydric phenol though this quantity may vary somewhat without departing from the invention. It will also be understood that the invention is not restricted to the named acids but also includes other suitable strong acids.

The ratio of the reactants acetone:polyhydric phenol may vary between approximately 1:2 and 2:1 but is preferably between 1:1 and 2:1. As the ratio of acetone:polyhydric phenol increases, it is advantageous to employ a higher ratio of water:polyhydric phenol.

The polyhydric phenols employed in the process just described are those containing two or three hydroxyl groups per molecule, particularly those in which at least two hydroxyl groups occupy the meta-position in relation to each other. Resorcinol or phloroglucinol are preferably used in which all the hydroxyl groups occupy the meta-position in relation to each other. Specific preparations of compounds encompassed by the present invention are illustrated by the following examples.

Example I 550 parts by weight of resorcinol were dissolved in 550 parts by weight of water. 145 parts by weight of acetone (i.e. mol. ratio acetone: resorcinol=1:2) and 94 parts by weight of 37% HCl were added to this solution. This mixture was then allowed to stand at room temperature for 48 hours, when a crystal slurry slowly separated off. The crystals were then sucked off and washed with distilled water and then dried in vacuo at 70° C. The crystal powder was white and had a melting point of 225° C. The molecular weights determined were 285 and 290 (calculated for $C_{18}H_{20}O_4$:300).

Analysis of the product gave the following results:

|  | C | H | O |
|---|---|---|---|
| Calculated for $C_{18}H_{20}O_4$ | 72.0 | 6.7 | 21.3 |
| Found | 71.8 | 6.7 | 21.2 |
| Found | 71.9 | 6.9 | 21.1 |

In the example the reaction product is 2,4,4-trimethyl-7,2',4'-trihydroxyflavan. The OH-number was found to be 1.02 eq./100 g. (theoretical value for 2,4,4-trimethyl-7,2',4'-trihydroxyflavan 1.00). The quantity of product obtained was 345 parts by weight (yield, calculated on resorcinol, 46%).

Example II

In a manner similar to that described in Example I, the starting materials were 1,100 parts by weight of resorcinol, 1,100 parts by weight of water, 580 parts by weight of acetone (i.e. mol. ratio acetone:resorcinol=1:1) and 165 parts by weight of HCl of 37% concentration; the yield of washed and dried product was 1,200 parts by weight, i.e. 80%, calculated on resorcinol. Upon analysis this product was found to be identical with that of Example I.

Example III

In the same manner as in Example I, the starting materials were 1,100 parts by weight of resorcinol, 1,500 parts by weight of water, 870 parts by weight of acetone (i.e. mol. ratio acetone:resorcinol=3:2) and 200 parts by weight of $H_2SO_4$ of 37% concentration.

After a reaction time of 48 hours, there was obtained 1,400 parts by weight of washed and dried product (i.e. 93% calculated on resorcinol).

Example IV

When starting, in the same way as in Example I, from 110 parts by weight of resorcinol, 110 parts by weight of water, 29 parts by weight of acetone (i.e. mol. ratio acetone:resorcinol=1:2) and 9.5 grams of $H_2SO_4$ of 96% concentration a yield of 66 parts by weight of washed and dried substance was found after 48 hours, i.e. 44%, calculated on resorcinol.

As in the case of the product in Example III, this product was also found to be identical with that in Example I.

The polyalkylhydroxy-phenylchromans of the present invention may be employed in the preparation of epoxy resins as for example by reaction with epichlorohydrin in the presence of alkali. The use of these phenylchromans in this manner is described in detail in copending application No. 658,518, filed May 13, 1957, which is incorporated by reference into this specification. These compounds may also be employed for curing polyepoxides having an epoxy equivalency greater than 1.0 by heating the polyepoxide and phenylchroman derivative in the presence of an acidic or alkaline catalyst. This use of phenylchromans is described in copending application Serial No. 658,487, filed May 13, 1957, which is, in like manner, incorporated by reference into this specification.

Having thus described this invention in full what is desired to be protected by United States Letters Patent is:

1. The process for the preparation of flavan compounds comprising the steps of reacting a mixture of acetone and a polyhydric phenol containing not more than three hydroxyl groups all of said groups occupying the meta-position in relation to each other, in the presence of not more than 20 parts by weight strong inorganic acid chosen from the class consisting of hydrochloric, sulfuric and phosphoric acid and 18 to 120 parts by weight of water, both calculated per 100 parts by weight polyhydric phenol, at a temperature less than 70° C.

2. The process for the preparation of flavan compounds comprising the steps of reacting a mixture of acetone and resorcinol in the presence of not more than 20 parts by weight strong inorganic acid chosen from the class consisting of hydrochloric, sulfuric and phosphoric acid and 18 to 120 parts by weight of water, both calculated per 100 parts by weight resorcinol, at a temperature less than 70° C.

3. As a new composition of matter, a compound of the formula

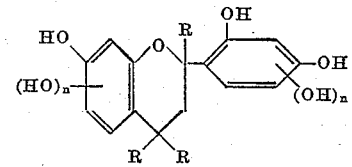

wherein R is a lower alkyl radical and n is 0 to 1.

4. As a new composition of matter, the compound 2,4,4-trimethyl-7,2',4'-trihydroxyflavan.

References Cited in the file of this patent
UNITED STATES PATENTS 2,418,458    Bousquet _____ Apr. 8, 1947

OTHER REFERENCES

Baker et al.: J. Chem. Soc. (1939) pp. 195–9.
Baker et al.: J. Chem. Soc. (1952) pp. 1774–85.
Elderfield: Heterocyclic Compounds, vol. 2, pp. 283–409 (1951) (Wiley).